(12) United States Patent
Reddy

(10) Patent No.: US 9,988,873 B2
(45) Date of Patent: Jun. 5, 2018

(54) CONTROLLED SWELLING OF SWELLABLE POLYMERS DOWNHOLE

(71) Applicant: Halliburton Energy Services, Inc., Houston, TX (US)

(72) Inventor: B. Raghava Reddy, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days. days.

(21) Appl. No.: 15/115,480

(22) PCT Filed: Jun. 27, 2014

(86) PCT No.: PCT/US2014/044639
§ 371 (c)(1),
(2) Date: Jul. 29, 2016

(87) PCT Pub. No.: WO2015/199728
PCT Pub. Date: Dec. 30, 2015

(65) Prior Publication Data
US 2017/0166797 A1    Jun. 15, 2017

(51) Int. Cl.
*E21B 33/13* (2006.01)
*E21B 43/16* (2006.01)
*C09K 8/42* (2006.01)
*C09K 8/508* (2006.01)
*C09K 8/512* (2006.01)

(52) U.S. Cl.
CPC .............. *E21B 33/13* (2013.01); *C09K 8/426* (2013.01); *C09K 8/508* (2013.01); *C09K 8/5083* (2013.01); *C09K 8/512* (2013.01); *E21B 43/16* (2013.01)

(58) Field of Classification Search
None
See application file for complete search history.

(56) References Cited

U.S. PATENT DOCUMENTS

| 6,165,947 | A | 12/2000 | Chang et al. |
| 6,667,279 | B1* | 12/2003 | Hessert .................... C08L 1/26 507/209 |
| 6,889,766 | B2 | 5/2005 | Creel et al. |
| 6,983,799 | B2 | 1/2006 | Reddy et al. |
| 7,287,586 | B2 | 10/2007 | Everett et al. |

(Continued)

OTHER PUBLICATIONS

International Search Report and Written Opinion for PCT/US2014/044639 dated Mar. 27, 2015.

*Primary Examiner* — Anuradha Ahuja
(74) *Attorney, Agent, or Firm* — McDermott Will & Emery LLP

(57) ABSTRACT

A method of using a swellable polymer downhole may include introducing a first treatment fluid comprising a first aqueous fluid, a salt with a multivalent cation, and the swellable polymer into a wellbore penetrating a subterranean formation; placing the swellable polymer in a portion of the subterranean formation; contacting the swellable polymer in the portion of the subterranean formation with a second treatment fluid comprising a second aqueous fluid and at least one selected from the group consisting of a precipitating agent, a chelating agent, and a combination thereof; and swelling the swellable polymer in the portion of the subterranean formation, thereby reducing fluid flow through the portion of the subterranean formation.

19 Claims, 1 Drawing Sheet

(56) References Cited

U.S. PATENT DOCUMENTS

| | | |
|---|---|---|
| 7,690,429 B2 | 4/2010 | Creel et al. |
| 7,866,394 B2 | 1/2011 | Creel et al. |
| 7,891,424 B2 | 2/2011 | Creel et al. |
| 2006/0042797 A1 | 3/2006 | Fredd et al. |
| 2006/0234871 A1 | 10/2006 | Dalrymple et al. |
| 2007/0204989 A1* | 9/2007 | Tang ................. C09K 8/508 166/270 |
| 2010/0212906 A1* | 8/2010 | Fulton ................. C09K 8/62 166/308.5 |
| 2010/0314114 A1* | 12/2010 | Moradi-Araghi ........ C09K 8/12 166/305.1 |
| 2011/0277996 A1* | 11/2011 | Cullick ................. E21B 33/138 166/250.12 |
| 2014/0131043 A1* | 5/2014 | Moradi-Araghi ........ C09K 8/12 166/300 |
| 2014/0138092 A1 | 5/2014 | Reddy et al. |
| 2014/0158355 A1* | 6/2014 | Wuthrich ............... C09K 8/588 166/294 |

\* cited by examiner

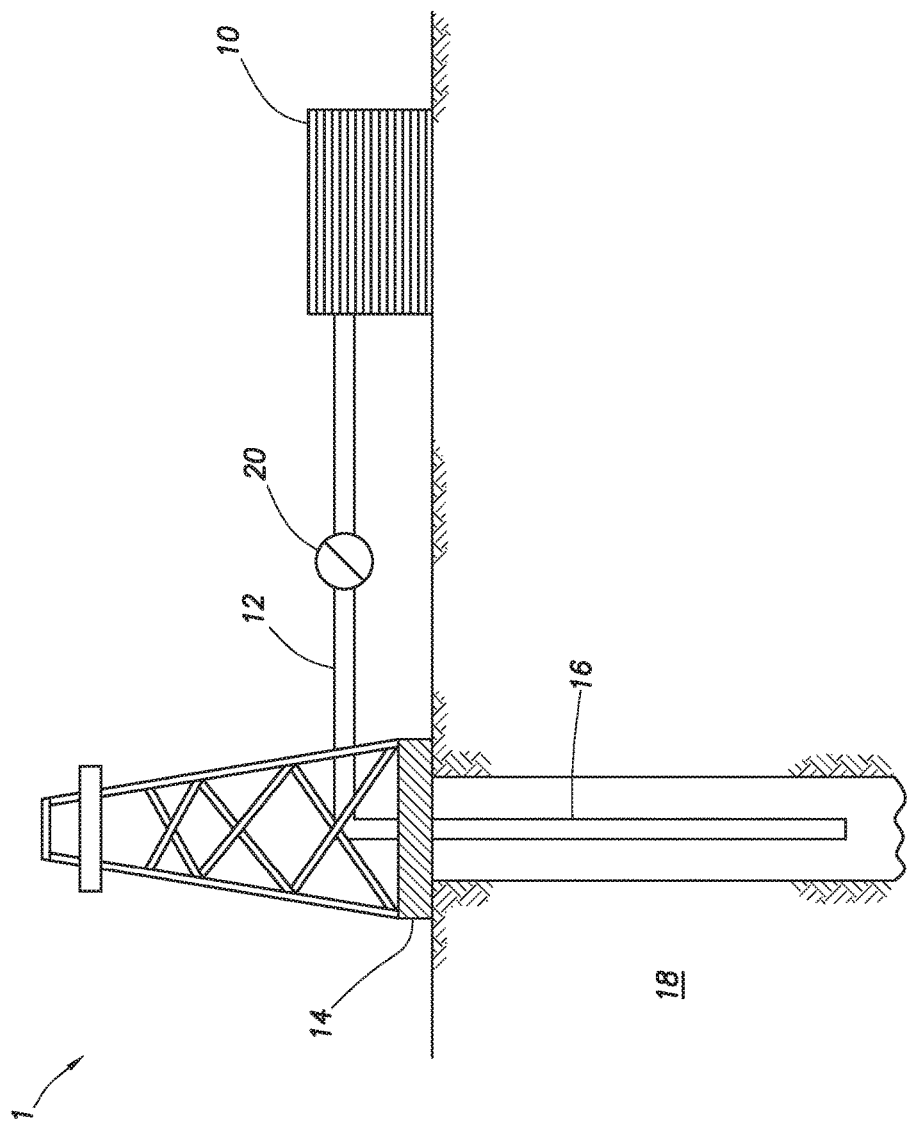

CONTROLLED SWELLING OF SWELLABLE POLYMERS DOWNHOLE

BACKGROUND

The present disclosure relates to the use of swellable polymers in downhole operations.

Wellbore fluids used in oil and gas exploration and production use a variety of additives to achieve a desired property for the fluid or to produce a desired result in the wellbore. One example of an additive that can serve many purposes is a water-swellable material. For example, in a swollen form, these materials can increase the solid/liquid volume ratio of a wellbore fluid, which, when placed in a permeable portion of the formation, may allow for the swollen materials to plug or reduce fluid flow through that permeable portion of the formation resulting in problems such as lost circulation of wellbore treatment fluids.

Generally, the swellable polymers are placed downhole at the permeable zone by mixing with a carrier fluid and introducing the fluid downhole. However, such techniques may, in some instances, limit the concentration of the swellable polymers in the carrier fluid because as the polymer swells, the fluidity or pumpability of the fluid decreases. Because many swellable polymers can increase in volume by about 400%, the pumpability of the fluid may decrease prematurely even with relatively low concentrations of swellable polymer and interfere with placement in the correct location, and in some cases may reduce the depth of placement, for example in a fracture. In such cases use of large quantities of carrier fluid may have to be used to facilitate pumping, which can be time consuming and costly. In cases, where placement deep inside a fracture or cavernous zones becomes problematic due to swollen particle sizes, carrier fluids with high salt concentrations are used in which the particle swelling is less. Once the partially swollen particles are placed within a zone as desired, a subsequent fluid based on fresh water or low-salt concentration brine, is pumped through the swollen particle mass to increase the swollen particle volume in situ. The decrease in swollen volume of water-swellable particles by salt solutions is dependent on the type of salt and concentration. It is a common practice to use monovalent salts such as sodium chloride or potassium chloride. The swellable-particle volume increase with monovalent salts is still significantly high, and may be subject to the same limitations as fresh water systems.

The use of fluids containing divalent ions further decreases the swelling of the particles, which allows for ease of pumping and deeper placement of particles inside a high permeability zone, such as a fracture. However, further swelling of the particles in situ upon pumping fresh water or an aqueous fluid containing lower salt concentration is negligible. Therefore, plugging of such zones by swellable particles is not practical. Thus, there is a need for fluid compositions containing swellable particles that allow for less swelling during placement and enhanced swelling in situ after placement.

BRIEF DESCRIPTION OF THE DRAWINGS

The following FIGURES are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIG. 1 provides an illustrative schematic of a system that can deliver treatment fluids of the present disclosure to a downhole location, according to one or more embodiments.

DETAILED DESCRIPTION

The present disclosure relates to the use of water swellable polymers, referred to hereafter simply as swellable polymers, in downhole operations, and, more specifically, controlling timing and degree of swelling for the swellable polymers.

In some embodiments, the treatment fluids and methods described herein may allow for causing swellable polymers to swell to a greater extent after placement downhole. Such treatment fluids and methods may mitigate the drawbacks of premature swelling of the swellable polymer. Such advantages may provide for more efficient lost circulation control, diversion, and plugging operations downhole.

In some embodiments, a swellable polymer is placed downhole in an aqueous carrier fluid that includes salts with multivalent cations. The multivalent cations generally interact with the swellable polymer and prevent swelling to the swellable polymer's maximum swollen volume. Then, after placement in a portion of a subterranean formation, the interaction between the multivalent cations and the swellable polymer may be disrupted, thereby allowing the swellable polymer to swell to a greater volume in situ and further reduce the fluid flow through the portion of the subterranean formation.

Disruption of the interaction between the multivalent cations and the swellable polymer may be achieved by dilution. For example, in some instances, an aqueous fluid with (1) fresh water, (2) that does not contain the multivalent cations, or (3) contains significantly lower amounts of the multivalent cations (e.g., 10 times less) may be introduced into the portion of the formation with the swellable polymer therein. This may reduce the concentration of any free multivalent cations proximal to the swellable polymer, remove a portion of the multivalent cations associated with the swellable polymer, or both. In another example, a precipitating agent, a chelating agent, or both may be introduced into (and optionally shut in) the portion of the formation with the swellable polymer therein. The precipitating agents and/or chelating agents interact with the multivalent cations by precipitation or chelation and reduce the interaction of the multivalent cations with the swellable polymer. In some instances, a combination of the foregoing may be used (e.g., treating the swellable polymer in the formation via dilution and then with precipitating agent, a chelating agent, or both). The in situ swelling may be observed or confirmed when the injection pressure increases.

After in situ swelling of the swellable polymer, subsequent operations may be performed. In some instances, the reduced fluid flow may mitigate or prevent the flow of water from the formation to the wellbore, which may increase the ratio of produced hydrocarbon to produced water, thereby increasing the efficacy of production operations.

In some embodiments, a treatment fluid may be introduced into the wellbore after in situ swelling of the swellable polymer in the subterranean formation. In some instances, the reduced fluid flow through the portion of the subterranean formation may divert a portion of the subsequent treatment fluid to another portion of the subterranean formation.

In some embodiments, a sweeping fluid in an enhanced oil recovery (EOR) flooding operation may be introduced into the subterranean formation after in situ swelling of the swellable polymer in the subterranean formation. The sweeping fluid may be diverted to sweep oil from unswept zones by preventing the loss of fluid into high permeability zones now at least partially plugged by the swollen polymer.

Swellable polymers suitable for use in the compositions and methods described herein are crosslinked three dimensional network particulate solid polymers that do not dissolve in aqueous fluids but, rather, swell and increase solid volume. Examples of swellable polymers suitable for use in the compositions and methods described herein may include, but are not limited to, crosslinked polyacrylamide; crosslinked partially hydrolyzed polyacrylamide; crosslinked polyacrylate; crosslinked polyacrylate salts; salts of crosslinked polyalkacrylate; crosslinked hydrolyzed polyacrylonitrile; salts of crosslinked carboxyalkyl starch, for example, salts of carboxymethyl starch; salts of crosslinked carboxyalkyl cellulose, for example, salts of carboxymethyl cellulose; salts of any crosslinked carboxyalkyl polysaccharide; crosslinked copolymers of acrylamide and acrylate monomers; crosslinked starch grafted with acrylonitrile and acrylate monomers; crosslinked polymers of two or more of allylsulfonate, 2-acrylamido-2-methyl-1-propanesulfonic acid, 3-allyloxy-2-hydroxy-1-propane-sulfonic acid, acrylamide, and acrylic acid monomers; and the like; and any combination thereof. In some preferred embodiments, the crosslinked polymer of the swellable polymer contains some anionic character due to the presence of anionic groups such as carboxylates, sulfonates, phosphonates, and combinations thereof.

In some embodiments, an unswollen swellable polymer may have a particle size that may range from a lower limit of about 100 mesh (US Standard Mesh Size), 80 mesh, or 50 mesh to an upper limit of about 6 mesh, 10 mesh, or 20 mesh, and wherein the particle size may range from any lower limit to any upper limit and encompasses any subset therebetween. In some embodiments, an unswollen swellable polymer may have a size in at least one dimension (e.g., width, length, or diameter) ranging from a lower limit of about 500 microns or 1 mm to an upper limit of about 4 mm or 2 mm, and wherein the size in at least one dimension may range from any lower limit to any upper limit and encompasses any subset therebetween. Particles of the unswollen swellable polymer may be in any shape including, but not limited to, cubic, spherical, elongate (e.g., rods or fibers), flakes, rhomboidal, ellipsoidal, any hybrid thereof, and any combination thereof.

In some embodiments, a swellable polymer may be present in a treatment fluid in an amount ranging from a lower limit of about 0.001 ppg (pound per gallon of aqueous fluid), 0.01 ppg, or 0.1 ppg by weight of the treatment fluid to an upper limit of about 5 ppg, 1 ppg, or 0.5 ppg, and wherein the amount of the swellable polymer may range from any lower limit to any upper limit and encompasses any subset therebetween.

Examples of salts with multivalent cations suitable for use in the compositions and methods described herein may include, but are not limited to, magnesium chloride, magnesium bromide, calcium chloride, calcium bromide, calcium acetate, magnesium acetate, ferrous chloride, ferric chloride, ferrous ammonium sulfate, aluminum sulfate, aluminum chloride, alums (e.g., potassium aluminum sulfate), zirconium (IV) salts, and the like, and any combination thereof.

In some embodiments, salts with multivalent cations may be present in the treatment fluid in an amount ranging from a lower limit of about 1%, 5%, or 10% by weight of the aqueous fluid to an upper limit of about 40%, 30%, or 20% by weight of the aqueous fluid, and wherein the amount of the salts may range from any lower limit to any upper limit and encompasses any subset therebetween.

Examples of precipitating agents suitable for use in the compositions and methods described herein may include, but are not limited to, hydroxides, carbonates, bicarbonates, sulfates, phosphates, oxalates of alkali metal salts, ammonium ion, and the like, and any combination thereof. A specific example of such a precipitating agent is sodium carbonate.

In some embodiments, a precipitating agent may be present in the treatment fluid in an amount ranging from a lower limit of about 0.01%, 0.05%, or 0.1% by weight of the aqueous fluid to an upper limit of about 3%, 1%, 0.5%, or 0.1% by weight of the aqueous fluid, and wherein the amount of the precipitating agent may range from any lower limit to any upper limit and encompasses any subset therebetween.

Examples of chelating agents suitable for use in the compositions and methods described herein may include, but are not limited to, aminopolycarboxylic acid-based chelating agents (e.g., ethylenediaminetetraacetic acid, nitrilotriacetic acid, iminodiacetate, pentetic acid, ethylene glycol tetraacetic acid, 1,2-bis(o-aminophenoxy)ethane-N, N,N',N'-tetraacetic acid, and 1,4,7,10-tetraazacyclododecane-1,4,7,10-tetraacetic acid), amino methylene phosphonate-based chelating agents (e.g., amino tris(methylene phosphonic acid), ethylenediamine tetra(methylene phosphonic acid), tetramethylenediamine tetra(methylene phosphonic acid), hexamethylenediamine tetra(methylene phosphonic acid), 1-hydroxyethylidene-1,1-diphosphonic acid, bis(hexamethylene triamine) penta(methylene phosphonic acid and diethylenetriamine penta(methylene phosphonic acid)), phosphono carboxylic acids (e.g., 2-phosphonebutane-1,2,4-tricarboxylic acid) and the like, any salt thereof, and any combination thereof. Examples of commercially available phosphonic acid based chelating agents are available from Italmatch Chemicals of Italy under the trade name DEQUEST™.

In some embodiments, a chelating agent may be present in the treatment fluid in an amount ranging from a lower limit of about 0.01%, 0.05%, or 0.1% by weight of the aqueous fluid to an upper limit of about 2%, 1%, 0.5%, or 0.1% by weight of the aqueous fluid, and wherein the amount of the chelating agent may range from any lower limit to any upper limit and encompasses any subset therebetween.

In various embodiments, systems configured for delivering the treatment fluids described herein to a downhole location are described. In various embodiments, the systems can comprise a pump fluidly coupled to a tubular that penetrates a wellbore penetrating a subterranean formation having a swellable polymer disposed therein, the tubular containing a treatment fluid that comprises an aqueous fluid and at least one selected from the group consisting of a precipitating agent, a chelating agent, and a combination thereof.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment fluid before it reaches the high pressure pump.

In some embodiments, the systems described herein can further comprise a mixing tank that is upstream of the pump and in which the treatment fluid is formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

FIG. 1 shows an illustrative schematic of a system that can deliver treatment fluids of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a treatment fluid of the present disclosure may be formulated. The treatment fluid may be conveyed via line 12 to wellhead 14, where the treatment fluid enters tubular 16, tubular 16 extending from wellhead 14 into subterranean formation 18. Upon being ejected from tubular 16, the treatment fluid may subsequently penetrate into subterranean formation 18. In some instances, tubular 16 may have a plurality of orifices (not shown) through which the treatment fluid of the present disclosure may enter the wellbore proximal to a portion of the subterranean formation 18 to be treated. In some instances, the wellbore may further comprise equipment or tools (not shown) for zonal isolation of a portion of the subterranean formation 18 to be treated.

Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Each of embodiments A and B may have one or more of the following additional elements in any combination:

A: a method that includes introducing a first treatment fluid comprising a first aqueous fluid, a salt with a multivalent cation, and a swellable polymer into a wellbore penetrating a subterranean formation; placing the swellable polymer in a portion of the subterranean formation; contacting the swellable polymer in the portion of the subterranean formation with a second treatment fluid comprising a second aqueous fluid and at least one selected from the group consisting of a precipitating agent, a chelating agent, and a combination thereof; and swelling the swellable polymer in the portion of the subterranean formation, thereby reducing fluid flow through the portion of the subterranean formation; and B: a method that includes introducing a first treatment fluid comprising a first aqueous fluid, a salt with multivalent cations, and a swellable polymer into a wellbore penetrating a subterranean formation; placing the swellable polymer in a portion of the subterranean formation; displacing the first aqueous fluid with a second aqueous fluid that comprises one selected from the group consisting of: fresh water, none of the salt with a multivalent cation dissolved therein, and a lower concentration of the salt with a multivalent cation dissolved therein as compared to the first treatment fluid; contacting the swellable polymer in the portion of the subterranean formation with a second treatment fluid comprising a third aqueous fluid and at least one selected from the group consisting of a precipitating agent, a chelating agent, and a combination thereof, thereby precipitating, chelating, or both at least some of the multivalent cations associated with the swellable polymer; and swelling the swellable polymer in the portion of the subterranean formation, thereby reducing fluid flow through the portion of the subterranean formation.

By way of non-limiting example, exemplary combinations applicable to Embodiments A, B include: Element 1:

wherein the salt is present in the first treatment fluid in an amount of about 1% to about 40% by weight of the first aqueous fluid; Element 2: wherein the salt comprises at least one selected from the group consisting of magnesium chloride, magnesium bromide, calcium chloride, calcium bromide, calcium acetate, magnesium acetate, ferrous chloride, ferric chloride, ferrous ammonium sulfate, aluminum sulfate, aluminum chloride, an alum, a zirconium (IV) salt, and any combination thereof; Element 3: wherein the swellable polymer is present in the first treatment fluid in an amount of about 0.001 pounds per gallon of the first aqueous fluid to about 5 pounds per gallon of the first aqueous fluid; Element 4: wherein the swellable polymer comprises at least one selected from the group consisting of crosslinked polyacrylamide; crosslinked partially hydrolyzed polyacrylamide; crosslinked polyacrylate; a salt of crosslinked polyacrylate; a salt of crosslinked polyalkacrylate; crosslinked hydrolyzed polyacrylonitrile; a salt of crosslinked carboxyalkyl starch; a salt of crosslinked carboxyalkyl cellulose; a salt of any crosslinked carboxyalkyl polysaccharide; crosslinked copolymers of acrylamide and acrylate monomers; crosslinked starch grafted with acrylonitrile and acrylate monomers; a crosslinked polymer of two or more of allylsulfonate, 2-acrylamido-2-methyl-1-propanesulfonic acid, 3-allyloxy-2-hydroxy-1-propane-sulfonic acid, acrylamide, and an acrylic acid monomer; and any combination thereof; Element 5: wherein the precipitating agent is present in the second treatment fluid in an amount of about 0.01% to about 1% by weight of the second aqueous fluid; Element 6: wherein the precipitating agent comprises at least one selected from the group consisting of a hydroxide, a carbonate, a bicarbonate, a sulfate, a phosphate, an oxalates of an alkali metal salt, an ammonium ion, and any combination thereof; Element 7: wherein the chelating agent is present in the second treatment fluid in an amount of about 0.01% to about 1% by weight of the second aqueous fluid; Element 8: wherein the chelating agent comprises at least one selected from the group consisting of an aminopolycarboxylic acid-based chelating agent, an amino methylene phosphonate-based chelating agent, phosphono carboxylic acid, any salt thereof, and any combination thereof; Element 9: Element A8 wherein the aminopolycarboxylic acid-based chelating agent comprises at least one selected from the group consisting of ethylenediaminetetraacetic acid, nitrilotriacetic acid, iminodiacetate, pentetic acid, ethylene glycol tetraacetic acid, 1,2-bis(o-aminophenoxy)ethane-N,N,N',N'-tetraacetic acid, 1,4,7,10-tetraazacyclododecane-1,4,7,10-tetraacetic acid), and any combination thereof; Element 10: Element A8 wherein the amino methylene phosphonate-based chelating agent comprises at least one selected from the group consisting of amino tris(methylene phosphonic acid), ethylenediamine tetra(methylene phosphonic acid), tetramethylenediamine tetra(methylene phosphonic acid), hexamethylenediamine tetra(methylene phosphonic acid), 1-hydroxyethylidene-1,1-diphosphonic acid, bis(hexamethylene triamine) penta(methylene phosphonic acid, diethylenetriamine penta(methylene phosphonic acid), and any combination thereof; Element 11: the method further including producing hydrocarbons from the subterranean formation; Element 12: the method further including introducing a third treatment fluid into the wellbore penetrating the subterranean formation; and allowing the swellable polymer in the portion of the subterranean formation to divert the third treatment fluid to a second portion of the subterranean formation; and Element 13: the method further including introducing a sweeping fluid into the subterranean formation; and allowing the swellable polymer in the portion of the subterranean formation to divert the sweeping fluid to a second portion of the subterranean formation.

By way of non-limiting example, exemplary combinations applicable to A, B include: Elements 1-2 in combination; Elements 3-4 in combination; Elements 5-6 in combination; Elements 7-8 in combination; Elements 7-9 in combination; Elements 7, 8 and 10 in combination; Elements 7-10 in combination; combinations of two or more of Elements 1, 3, 5, or 7; combinations of two or more of Elements 2, 4, 6, or 8 and optionally Elements 9, 10, or both; any of the foregoing in combination; at least one of Elements 11-13 in combination with any of the foregoing; and at least one of Elements 11-13 in combination with one of Elements 1-10.

Yet another embodiment disclosed herein includes:

C: a system that includes a wellhead with a tubular extending therefrom and into a wellbore in a subterranean formation having disposed therein a swellable polymer associated with a multivalent cation of a salt; and a pump fluidly coupled to a tubular, the tubular containing a treatment fluid that comprises an aqueous fluid and at least one selected from the group consisting of a precipitating agent, a chelating agent, and a combination thereof. By way of non-limiting example, exemplary combinations applicable to Embodiment C include: Elements 1-2 in combination; Elements 3-4 in combination; Elements 5-6 in combination; Elements 7-8 in combination; Elements 7-9 in combination; Elements 7, 8 and 10 in combination; Elements 7-10 in combination; combinations of two or more of Elements 1, 3, 5, or 7; combinations of two or more of Elements 2, 4, 6, or 8 and optionally Elements 9, 10, or both; and any of the foregoing in combination.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques. Additionally, when used at the beginning of a list of numbers, the term "about" modifies each number in the list. Further, in some numerical listings of ranges, some lower limits listed may be greater than some upper limits listed. One skilled in the art will recognize that the selected subset will require the selection of an upper limit in excess of the selected lower limit.

One or more illustrative embodiments incorporating the embodiments disclosed herein are presented herein. Not all features of a physical implementation are described or shown in this application for the sake of clarity. It is understood that in the development of a physical embodiment incorporating the embodiments of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present disclosure, the following examples of preferred or representative embodiments are given. In no way should the following examples be read to limit, or to define, the scope of the invention.

EXAMPLES

Example 1

A variety of chelating agents and precipitating agents were tested for increasing the swelling of a crosslinked polyacrylate swelling agent (2 mm diameter) that was partially swollen in a calcium chloride solution. After swelling 0.5 g crosslinked polyacrylate in 20 mL of a calcium chloride solution for 24 hours at room temperature, the partially swollen crosslinked polyacrylate was filtered and weighed. Then, the swollen crosslinked polyacrylate was placed in 50 mL of fresh water for 24 hours at room temperature, after which the crosslinked polyacrylate was again filtered and weight measured. Then, the crosslinked polyacrylate was placed in 50 mL of a solution of the chelating agent or precipitating agent for 24 hours at room temperature, after which the crosslinked polyacrylate was again filtered and weight measured. Table 1 provides the weights of the crosslinked polyacrylamide after each step. For a control, crosslinked polyacrylate was swollen in fresh water for 24 hours at room temperature, and after filtering was weighed. The swollen weight was 70.7 g (141 times the original weight).

TABLE 1

| % $CaCl_2$ | Weight after $CaCl_2$ (g) | Weight after Fresh Water (g) | % Chelant or Precipitating Agent | Wt after Chelant or Precipitating Agent (g) |
|---|---|---|---|---|
| 10% | 5.6 | 5.6 | 0.1% TRILON $M^1$ in Na form | 8.0 |
| 20% | 6.7 | 4.8 | 0.1% EDTA-$(NH_4)_2$ salt | 6.2 |
| 30% | 6.7 | 4.2 | 0.2% $Na_2CO_3$ | 4.7 |
| 10% | 4.6 | 3.7 | 0.04% amino tris(methylene phosphonic acid)—$Na_5$ salt | 22 |
| 20% | 6.4 | 4.2 | 0.04% amino tris(methylene phosphonic acid)—$Na_5$ salt | 27 |
| 30% | 6.2 | 4.3 | 0.04% amino tris(methylene phosphonic acid)—$Na_5$ salt | 25 |

[1]TRILON M is an imino carboxylate chelant available from BASF Corporation

This example illustrates that compared to fresh water, salts with multivalent cations provide for limited swelling of swellable polymers (6.5 to 9.4% of fresh water values). Also, fresh water flush is insufficient to allow for the swellable polymer to increase in volume. However, the chelating agents and the precipitating agents described herein provide for swelling, especially, amino methylene phosphonate-based chelating agents.

Example 2

Similar to Example 1, the swelling characteristics of a crosslinked polyacrylate were investigated. In this example, exposure to the various fluids was at 160° F. for shorter lengths of time to simulate field conditions. 0.5 g crosslinked polyacrylate was exposed to 20 mL of a 10% calcium chloride solution for 2 hours at 160° F. Then, the crosslinked polyacrylate was filtered and weighed 4.1 g. The crosslinked polyacrylate was then placed in 50 mL of fresh water for 1 hour at 160° F., after which the crosslinked polyacrylate was again filtered and weighed (3.1 g). Then, the crosslinked polyacrylate was placed in 50 mL of a solution of 0.04% amino tris(methylene phosphonic acid) pentasodium salt for 3 hours or 48 hours at 160° F., after which the crosslinked polyacrylate was again filtered and weighed (26 g—for 3 hours, and 26.5 g for 48 hours). This example illustrates that the methods described herein may be suitable for use downhole for controlled swelling of swellable polymers.

Example 3

The swelling characteristics of a crosslinked polyacrylate that has been partially swollen in calcium chloride solution were investigated upon sequential exposure to chelating agents and precipitating agents. Some of the samples from Table 1 were further treated with a chelating agent. Specifically, the crosslinked polyacrylate was placed in 50 mL of a solution of 0.04% amino tris(methylene phosphonic acid) pentasodium salt for 24 hours at room temperature, after which the crosslinked polyacrylate was again filtered and weighed. Table 2 provides the details of the samples and weights.

TABLE 2

| % $CaCl_2$ | Stage 1 - % Chelant or Precipitating Agent | Wt after Stage 1 (g) | Stage 2 - Weight after amino tris(methylene phosphonic acid) (g) |
|---|---|---|---|
| 10% | 0.1% TRILON M in Na form | 8.0 | 37 |
| 20% | 0.1% EDTA-$(NH_4)_2$ salt | 6.2 | 35.5 |
| 30% | 0.2% $Na_2CO_3$ | 4.7 | 28.7 |

The use of two chelating/precipitating agents appears to have a synergistic effect in reversing the effects multivalent salts have on the swelling capacity of a swellable polymer.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
   introducing a first treatment fluid comprising a first aqueous fluid, a salt with a multivalent cation, and a swellable polymer into a wellbore penetrating a subterranean formation;
   placing the swellable polymer in a portion of the subterranean formation;
   introducing into the wellbore a second treatment fluid comprising a second aqueous fluid and at least one selected from the group consisting of a precipitating agent, a chelating agent, and a combination thereof;
   contacting the swellable polymer in the portion of the subterranean formation with the second treatment fluid; and
   wherein contacting the swellable polymer with the second treatment fluid causes swelling of the swellable polymer in the portion of the subterranean formation, thereby reducing fluid flow through the portion of the subterranean formation.

2. The method of claim 1, wherein the salt is present in the first treatment fluid in an amount of about 1% to about 40% by weight of the first aqueous fluid.

3. The method of claim 1, wherein the salt comprises at least one selected from the group consisting of magnesium chloride, magnesium bromide, calcium chloride, calcium bromide, calcium acetate, magnesium acetate, ferrous chloride, ferric chloride, ferrous ammonium sulfate, aluminum sulfate, aluminum chloride, an alum, a zirconium (IV) salt, and any combination thereof.

4. The method of claim 1, wherein the swellable polymer is present in the first treatment fluid in an amount of about 0.001 pounds per gallon of the first aqueous fluid to about 5 pounds per gallon of the first aqueous fluid.

5. The method of claim 1, wherein the swellable polymer comprises at least one selected from the group consisting of crosslinked polyacrylamide; crosslinked partially hydrolyzed polyacrylamide; crosslinked polyacrylate; a salt of crosslinked polyacrylate; a salt of crosslinked polyalkacrylate; crosslinked hydrolyzed polyacrylonitrile; a salt of crosslinked carboxyalkyl starch; a salt of crosslinked carboxyalkyl cellulose; a salt of any crosslinked carboxyalkyl polysaccharide; crosslinked copolymers of acrylamide and acrylate monomers; crosslinked starch grafted with acrylonitrile and acrylate monomers; a crosslinked polymer of two or more of allyl sulfonate, 2-acrylamido-2-methyl-1-propanesulfonic acid, 3-allyl oxy-2-hydroxy-1-propane-sulfonic acid, acrylamide, and an acrylic acid monomer; and any combination thereof.

6. The method of claim 1, wherein the second treatment fluid comprises the precipitating agent and the precipitating agent is present in the second treatment fluid in an amount of about 0.01% to about 1% by weight of the second aqueous fluid.

7. The method of claim 1, wherein the second treatment fluid comprises the precipitating agent and the precipitating agent comprises at least one selected from the group consisting of a hydroxide, a carbonate, a bicarbonate, a sulfate, a phosphate, an oxalates of an alkali metal salt, an ammonium ion, and any combination thereof.

8. The method of claim 1, wherein the second treatment fluid comprises the chelating agent and the chelating agent is present in the second treatment fluid in an amount of about 0.01% to about 1% by weight of the second aqueous fluid.

9. The method of claim 1, wherein the second treatment fluid comprises the chelating agent and the chelating agent comprises at least one selected from the group consisting of an aminopolycarboxylic acid-based chelating agent, an amino methylene phosphonate-based chelating agent, phosphono carboxylic acid, any salt thereof, and any combination thereof.

10. The method of claim 9, wherein the chelating agent comprises the aminopolycarboxylic acid-based chelating agent and the aminopolycarboxylic acid-based chelating agent comprises at least one selected from the group consisting of ethylene diaminetetraacetic acid, nitrilotriacetic acid, iminodiacetate, pentetic acid, ethylene glycol tetraacetic acid, 1,2-bis(o-aminophenoxy)ethane-N,N,N',N'-tetraacetic acid, 1,4,7,10-tetraazacyclododecane-1,4,7,10-tetraacetic acid), and any combination thereof.

11. The method of claim 9, wherein the chelating agent comprises the amino methylene phosphonate-based agent and the amino methylene phosphonate-based chelating agent comprises at least one selected from the group consisting of amino tris(methylene phosphonic acid), ethylenediamine tetra(methylene phosphonic acid), tetramethylenediamine tetra(methylene phosphonic acid), hexamethylenediamine tetra(methylene phosphonic acid), 1-hydroxyethylidene-1,1-diphosphonic acid, bis(hexamethylene triamine) penta(methylene phosphonic acid, diethylenetriamine penta(methylene phosphonic acid), and any combination thereof.

12. The method of claim 1 further comprising:
    producing hydrocarbons from the subterranean formation.

13. The method of claim 1 further comprising:
    introducing a third treatment fluid into the wellbore penetrating the subterranean formation; and
    allowing the swellable polymer in the portion of the subterranean formation to divert the third treatment fluid to a second portion of the subterranean formation.

14. The method of claim 1 further comprising:
    introducing a sweeping fluid into the subterranean formation; and
    allowing the swellable polymer in the portion of the subterranean formation to divert the sweeping fluid to a second portion of the subterranean formation.

15. A method comprising:
    introducing a first treatment fluid comprising a first aqueous fluid, a salt with a multivalent cation, and a swellable polymer into a wellbore penetrating a subterranean formation;
    placing the swellable polymer in a portion of the subterranean formation;
    after placing the swellable polymer in the portion of the subterranean formation, displacing the first aqueous fluid with a second aqueous fluid that comprises one selected from the group consisting of: fresh water, none of the salt with the multivalent cation dissolved therein, and a lower concentration of the salt with the multivalent cation dissolved therein as compared to the first treatment fluid;

after displacing with the second aqueous fluid, introducing into the wellbore a second treatment fluid comprising a third aqueous fluid and at least one selected from the group consisting of a precipitating agent, a chelating agent, and a combination thereof, and contacting the swellable polymer in the portion of the subterranean formation with the second treatment fluid, thereby precipitating, chelating, or both the multivalent cation; to cause swelling of the swellable polymer in the portion of the subterranean formation, thereby reducing fluid flow through the portion of the subterranean formation.

16. The method of claim 15, wherein the salt is present in the first treatment fluid in an amount of about 1% to about 40% by weight of the first aqueous fluid.

17. The method of claim 15, wherein the swellable polymer is present in the first treatment fluid in an amount of about 0.001 pounds per gallon of the first aqueous fluid to about 5 pounds per gallon of the first aqueous fluid.

18. The method of claim 15, wherein the second treatment fluid comprises the precipitating agent and the precipitating agent is present in the second treatment fluid in an amount of about 0.01% to about 1% by weight of the third aqueous fluid.

19. The method of claim 15, wherein the second treatment fluid comprises the chelating agent and the chelating agent is present in the second treatment fluid in an amount of about 0.01% to about 1% by weight of the third aqueous fluid.

* * * * *